(12) United States Patent
Fujiki

(10) Patent No.: US 11,636,857 B2
(45) Date of Patent: Apr. 25, 2023

(54) AGENT CONTROL DEVICE, AGENT CONTROL METHOD, AND STORAGE MEDIUM STORING PROGRAM

(71) Applicant: TOYOTA JIDOSHA KABUSHIKI KAISHA, Toyota (JP)

(72) Inventor: Takeshi Fujiki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 17/225,579

(22) Filed: Apr. 8, 2021

(65) Prior Publication Data

US 2021/0358494 A1     Nov. 18, 2021

(30) Foreign Application Priority Data

May 18, 2020    (JP) .............................. JP2020-087038

(51) Int. Cl.
*G10L 15/22*        (2006.01)
(52) U.S. Cl.
CPC .................................. *G10L 15/22* (2013.01)

(58) Field of Classification Search
CPC ....................................................... G10L 15/22
See application file for complete search history.

(56) References Cited

U.S. PATENT DOCUMENTS

| | | | | |
|---|---|---|---|---|
| 2014/0359439 | A1* | 12/2014 | Lyren .................... | G06F 16/951 707/706 |
| 2016/0322048 | A1 | 11/2016 | Amano et al. | |
| 2019/0066672 | A1* | 2/2019 | Wood ...................... | G10L 15/22 |
| 2022/0005470 | A1 | 1/2022 | Sugihara et al. | |

FOREIGN PATENT DOCUMENTS

| | | |
|---|---|---|
| JP | 2018-189984 A | 11/2018 |
| WO | 2014203495 A1 | 12/2014 |
| WO | 2020070878 A1 | 4/2020 |

* cited by examiner

*Primary Examiner* — Ibrahim Siddo
(74) *Attorney, Agent, or Firm* — Sughrue Mion, PLLC

(57) ABSTRACT

An agent control device capable of executing a plurality of agents, the agent control device including a processor. The processor is configured to output information from an agent that is being executed to a reporting section, and change a reporting style of the reporting section for each of the agents.

12 Claims, 8 Drawing Sheets

FIG.3

|  | SPEECH STYLE | DISPLAY STYLE |
|---|---|---|
| PROPRIETARY AGENT | MALE C | PROPRIETARY LOGO, FLASHING |
| NON-PROPRIETARY AGENT | FEMALE A | NON-PROPRIETARY LOGO, SLIDE IN |

US 11,636,857 B2

AGENT CONTROL DEVICE, AGENT CONTROL METHOD, AND STORAGE MEDIUM STORING PROGRAM

CROSS-REFERENCE TO RELATED APPLICATION

This application is based on and claims priority under 35 USC 119 from Japanese Patent Application No. 2020-087038 filed on May 18, 2020, the disclosure of which is incorporated by reference herein.

BACKGROUND

Technical Field

The present disclosure relates to an agent control device, an agent control method, and a storage medium storing a program to execute processing relating to an agent in response to a user request.

Related Art

Japanese Patent Application Laid-Open (JP-A) No. 2018-189984 discloses a voice interaction agent that receives an input audio signal, performs speech recognition processing on the input audio signal, and determines which agent to use to perform processing according to the input audio signal based on both the result of the speech recognition processing and agent information.

In cases in which plural agents are present, if the same manner of speaking, voice characteristics, and so on are employed for each of the agents, a user might lose track of which agent is responding, which could result in required interactions with an agent not going as desired.

SUMMARY

An object of the present disclosure is to provide an agent control device, an agent control method, and a program that enable a user to identify a responding agent in cases in which plural agents are present, and that are capable of suppressing unsuccessful agent interactions.

A first aspect is an agent control device capable of executing plural agents, the agent control device including an output section configured to output information from an agent that is being executed to a reporting section, and a change section configured to change a reporting style of the reporting section for each of the agents.

The agent control device of the first aspect is capable of executing plural agents. The output section of the agent control device outputs information from the executing agent to the reporting section, thereby enabling an interaction to be performed with a user.

In this agent control device, the change section changes the reporting style of the reporting section for each of the agents, thereby enabling the user to identify the responding agent. This enables unsuccessful agent interactions to be suppressed.

An agent control device of a second aspect is the agent control device of the first aspect, wherein the reporting section includes a speaker, and the change section is configured to change a speech style for each of the agents.

The agent control device of the second aspect provides information from the agents to the user in the form of speech. The speech style in which this speech is provided is changed for each agent by the change section. Note that the "speech style" includes male and female versions with different vocal tones, manners of speaking, and so on. The agent control device thereby enables the agent to be distinguished based on this speech, enabling interaction to be provided to the user without compromising driving safety when the user is driving.

An agent control device of third aspect is the agent control device of the second aspect, wherein a user is able to select one speech style from among the plural speech styles.

The agent control device of the third aspect allows the user to select their preferred speech style, thereby enabling any uncanniness felt due to an unfamiliar speech style during interaction to be suppressed.

An agent control device of a fourth aspect is the agent control device of any one of the first aspect to the third aspect, wherein the reporting section includes a display device, and the change section is configured to change an identifying image for identifying each respective agent.

The agent control device of the fourth aspect provides the identifying images for identifying the agents to the user. The change section changes the provided identifying image for each of the agents. The "identifying images" include logo images and color scheme images corresponding to the respective agents, as well as dynamic imagery that flashes or slides in. The agent control device thus enables the agent to be distinguished, even if speech interaction has stopped.

The present disclosure enables a user to identify the responding agent in cases in which plural agents are present, and is capable of suppressing unsuccessful agent interactions.

BRIEF DESCRIPTION OF THE DRAWINGS

Exemplary embodiments of the present disclosure will be described in detail based on the following figures, wherein:

FIG. 3 is a diagram illustrating content of setting data of the first exemplary embodiment;

DETAILED DESCRIPTION

First Exemplary Embodiment

Figure 1:
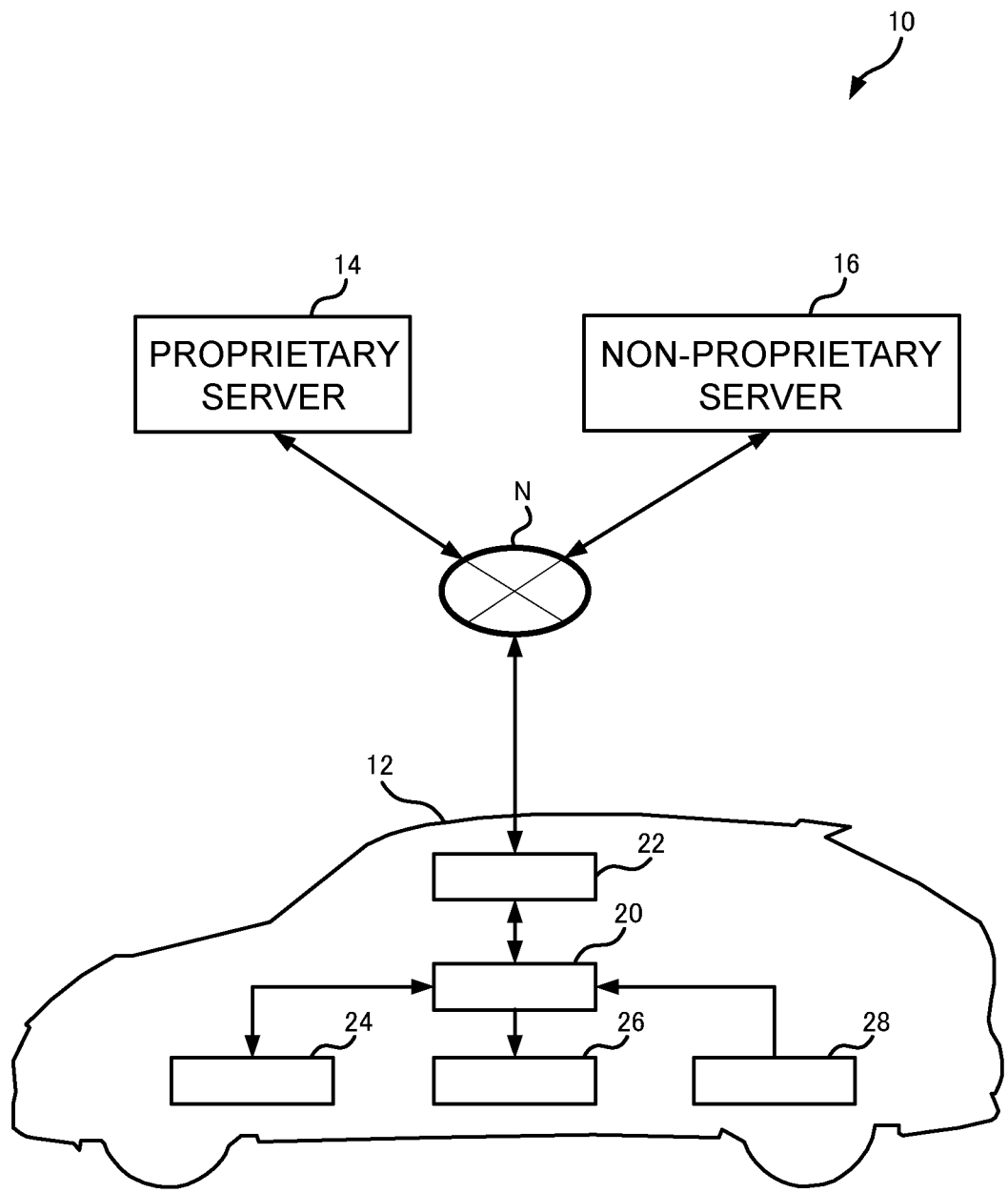
FIG. 1 is a diagram illustrating a schematic configuration of an agent system according to a first exemplary embodiment.
Figure 2:
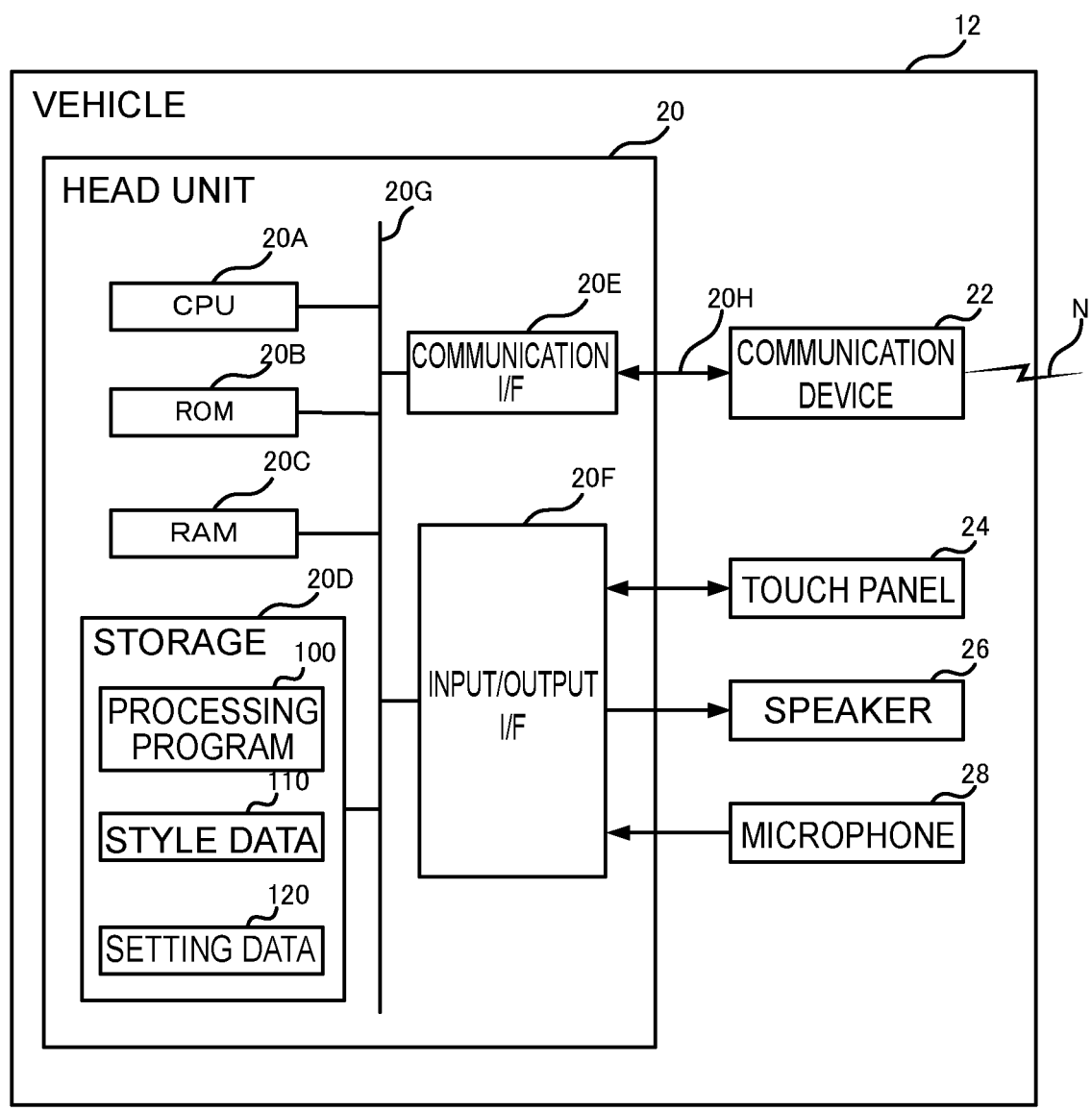
FIG. 2 is a block diagram illustrating hardware configuration of a vehicle of the first exemplary embodiment.

As illustrated in FIG. 1 and FIG. 2, an agent system 10 of a first exemplary embodiment is configured including a vehicle 12, a proprietary server 14, and a non-proprietary server 16. A head unit 20 serving as an agent control device, a communication device 22, a touch panel 24, a speaker 26, and a microphone 28 are installed in the vehicle 12. The touch panel 24 and the speaker 26 are both examples of a reporting section. The communication device 22 of the vehicle 12, the proprietary server 14, and the non-proprietary server 16 are connected together over a network N.

The proprietary server 14 is a server belonging to the original manufacturer of the vehicle 12. The proprietary server 14 includes a function to surmise the intent of an utterance of a user U intended to cause implementation of a function of a proprietary agent, which is a service of the vehicle manufacturer. The proprietary agent includes functions relating to phone calls, payments, weather and news acquisition, vehicle information acquisition, car navigation, requests for assistance, and the like.

The non-proprietary server 16 is a server belonging to an organization other than the manufacturer of the vehicle 12. The non-proprietary server 16 includes a function to surmise the intent of an utterance of the user U intended to cause implementation of a function of a non-proprietary agent, which is a service of the other organization. The non-proprietary agent includes functions relating to music provision, audiobooks, phone calls, weather and news acquisition, and the like. Note that the proprietary agent and the non-proprietary agent may implement similar types of function to each other.

Vehicle

As illustrated in FIG. 2, the head unit 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E, and the input/output I/F 20F are connected together so as to be capable of communicating through an internal bus 20G.

The CPU 20A is a central processing unit that executes various programs and controls various sections. Namely, the CPU 20A reads a program from the ROM 20B or the storage 20D, and executes the program using the RAM 20C as a workspace. The CPU 20A is an example of a processor.

The ROM 20B stores various programs and various data. The ROM 20B of the present exemplary embodiment stores a control program to control the head unit 20.

The RAM 20C serves as a workspace to temporarily store programs and data.

The storage 20D serves as a storage section configured by a hard disk drive (HDD) or a solid state drive (SSD), and stores various programs and various data. The storage 20D of the present exemplary embodiment stores a processing program 100, style data 110, and setting data 120.

The processing program 100 is a program for controlling the proprietary agent and the non-proprietary agent.

The style data 110 is stored data of speech styles and display styles for both the proprietary agent and the non-proprietary agent. The speech styles correspond to data representing varieties of speech output from the speaker 26, and include male and female versions with different vocal tones, manners of speaking, and so on. For example, there are six varieties of speech style data in the present exemplary embodiment, these being a male A, a male B, and a male C corresponding to male voices with different voice characteristics, and a female A, a female B, and a female C corresponding to female voices with different voice characteristics.

The display styles correspond to data relating to identifying images for display on the touch panel 24, and include logo images and color scheme images corresponding to the respective agents, as well as dynamic imagery that flashes or slides in. In the present exemplary embodiment, the identifying images include a proprietary logo of the proprietary agent and a non-proprietary logo of the non-proprietary agent.

The setting data 120 is stored data corresponding to a speech style and a display style that have been set for the proprietary agent, and a speech style and a display style that have been set for the non-proprietary agent. The speech styles and display styles stored as the setting data 120 are set based on selection by the user U.

For example, as illustrated in FIG. 3, a speech style "male C" and a display style "proprietary logo, flashing" are set as the setting data 120 for the proprietary agent, and a speech style "female A" and a display style "non-proprietary logo, slide in" are set as the setting data 120 for the non-proprietary agent.

As illustrated in FIG. 2, the communication I/F 20E is an interface for connecting to the communication device 22. This interface may, for example, employ a CAN communication protocol. The communication I/F 20E is connected to an external bus 20H.

The input/output I/F 20F is an interface for communicating with the touch panel 24, the speaker 26, and the microphone 28 installed in the vehicle 12. Note that the touch panel 24, the speaker 26, and the microphone 28 may be directly connected to the internal bus 20G.

The communication device 22 is a wireless communication module used to communicate with the proprietary server 14 and the non-proprietary server 16. The wireless communication module employs a communication protocol such as 5G, LTE, or Wi-Fi (registered trademark). The communication device 22 is connected to the network N.

The touch panel 24 is provided on an instrument panel or the like, and combines a liquid crystal display serving as a display device and a touch pad serving as an input device.

The speaker 26 is provided to the instrument panel, a center console, a front pillar, a dashboard, or the like, and is a device for outputting audio relating to the proprietary agent and the non-proprietary agent.

The microphone 28 is provided to the front pillar, dashboard, or the like of the vehicle 12, and is a device that picks up speech uttered by the user U, who is an occupant of the vehicle 12.

Figure 4:
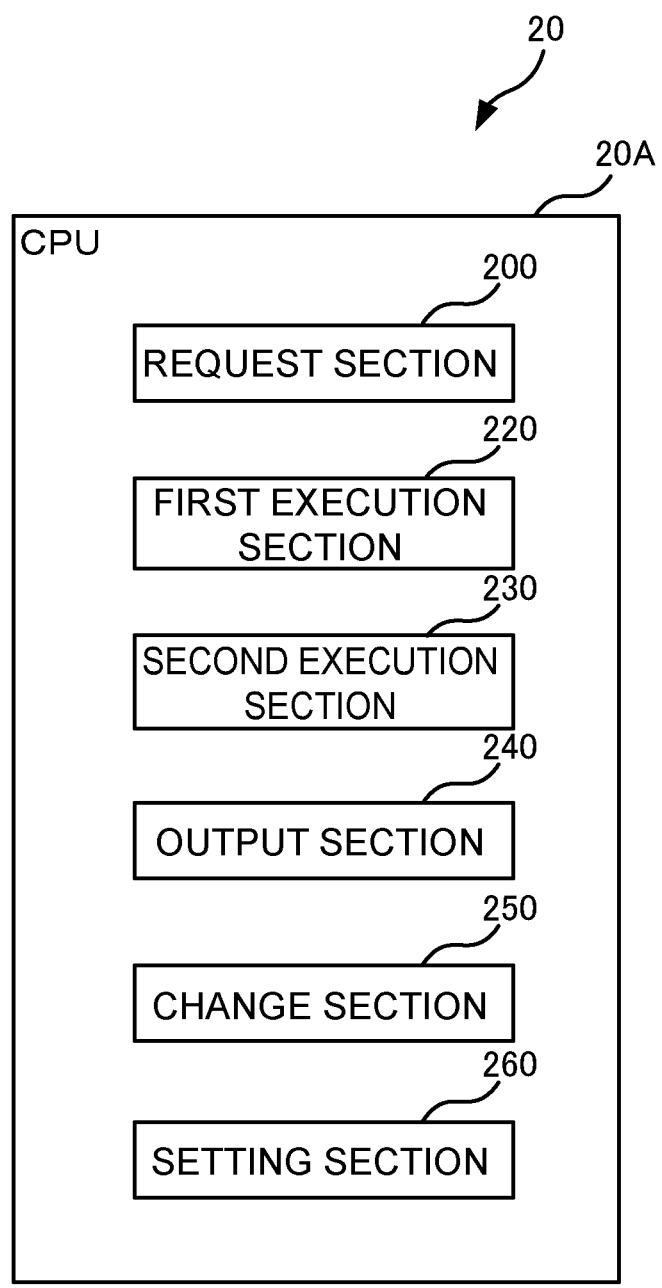
FIG. 4 is a block diagram illustrating a functional configuration of a head unit of the first exemplary embodiment.

In the head unit 20 of the present exemplary embodiment illustrated in FIG. 4, the CPU 20A executes the processing program 100 so as to function as a request section 200, a first execution section 220, a second execution section 230, an output section 240, a change section 250, and a setting section 260.

The request section 200 includes a function to request execution of an agent at a specific trigger. Examples of the "specific trigger" include an utterance from the user U into the microphone 28, or the pressing of a push-to-talk (PTT) switch provided to a steering wheel or the like. In cases in which speech information from the utterance of the user U contains a wake-up word for the proprietary agent, the request section 200 transmits the speech information to the proprietary server 14 to request execution of the proprietary agent. Moreover, in cases in which the speech information from the utterance of the user U contains a wake-up word for the non-proprietary agent, the request section 200 transmits the speech information to the non-proprietary server 16 to request execution of the non-proprietary agent.

The first execution section 220 includes a function to execute the proprietary agent. The first execution section 220 executes the proprietary agent function based on intent information provided by the proprietary server 14 to which the speech information from the utterance was transmitted.

The second execution section 230 includes a function to execute the non-proprietary agent. The second execution section 230 executes the non-proprietary agent function based on intent information provided by the non-proprietary server 16 to which the speech information from the utterance was transmitted.

The output section 240 includes a function to output information from the executing agent to the touch panel 24 and the speaker 26, serving as reporting sections. For example, in cases in which the proprietary agent performs a destination search using a car navigation function, the output section 240 outputs map information for the found destination to the touch panel 24, and outputs text information for the destination to the speaker 26 as text-to-speech data. As another example, in cases in which the non-proprietary agent is providing music, the output section 240 outputs the artist and title of a provided track to the touch panel 24, and outputs audio data for the track to the speaker 26.

The agent logo is displayed on the touch panel 24 based on the display style read from the setting data 120, with the agent information. Moreover, when there is a speech interaction with the user U, this speech is output from the speaker 26 based on the speech style read from the setting data 120.

The change section 250 includes a function to change a reporting style of the touch panel 24 and the speaker 26 for each of the agents. More specifically, in cases in which a given agent is started up, the change section 250 consults the setting data 120 in order to change the speech style and the display style so as to correspond to the given agent.

The setting section 260 includes a function to set one style selected by the user U from out of the plural styles stored in the style data 110. More specifically, after transitioning to a setting mode, the setting section 260 receives a speech style and a display style as selected by the user U, and stores the received speech style and display style in the setting data 120.

Note that a speech style and display style for the proprietary agent may be acquired from the proprietary server 14 as style information. Moreover, a speech style and display style for the non-proprietary agent may be acquired from the non-proprietary server 16 as style information.

Control Flow

Figure 5:
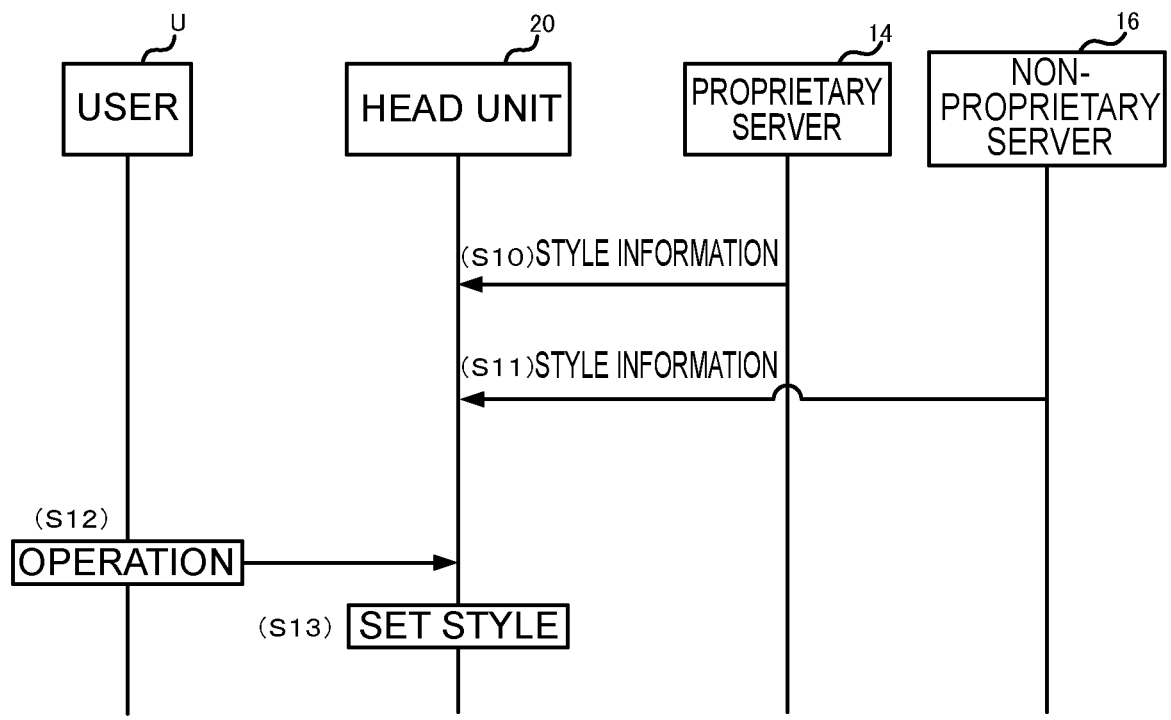
FIG. 5 is a sequence chart illustrating a flow of processing of a setting mode in an agent system of the first exemplary embodiment.
Figure 6:
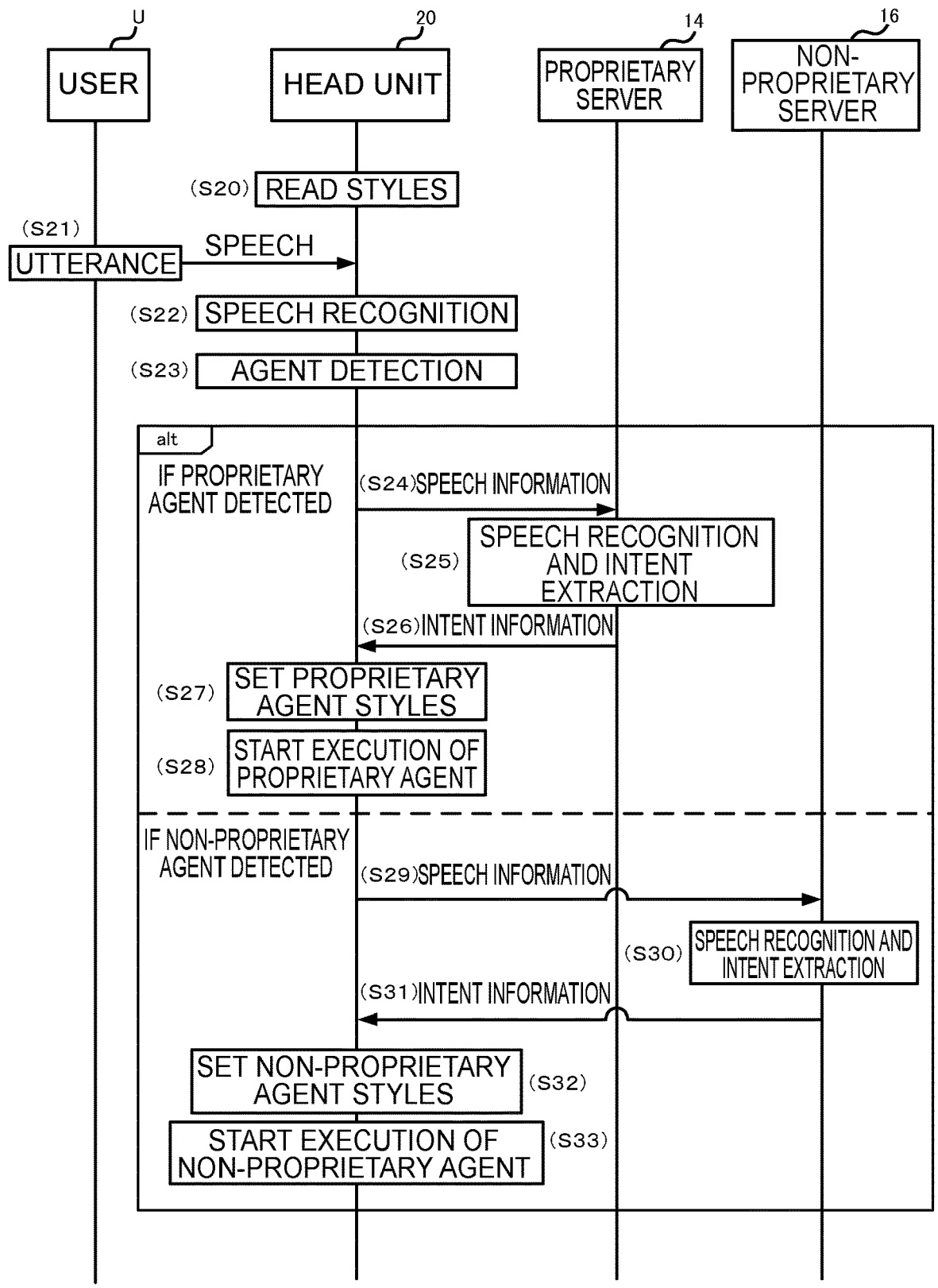
FIG. 6 is a sequence chart illustrating a flow of start-up processing in an agent system of the first exemplary embodiment.

Explanation follows regarding a flow of processing executed by the agent system 10 of the present exemplary embodiment, with reference to the sequence charts in FIG. 5 and FIG. 6. The processing of the head unit 20 is implemented by the CPU 20A functioning as the request section 200, the first execution section 220, the second execution section 230, the output section 240, the change section 250, and the setting section 260 described above.

First, explanation follows regarding setting mode processing in which a speech style and a display style are set for each of the agents.

At step S10 of FIG. 5, the proprietary server 14 transmits style information relating to speech styles and display styles for the proprietary agent to the head unit 20.

At step S11, the non-proprietary server 16 transmits style information relating to speech styles and display styles for the non-proprietary agent to the head unit 20.

The speech styles and display styles acquired from the respective servers are stored as the style data 110. Note that the speech styles and display styles do not necessarily have to be acquired from the respective servers when in the setting mode, and may be pre-stored as the style data 110, or may be acquired from the respective servers together with an agent application program.

At step S12, the user U operates the touch panel 24, and at step S13 the head unit 20 sets a speech style and a display style based on a selection operation by the user U. The respective set styles are stored as the setting data 120.

Next, explanation follows regarding start-up processing of the respective agents.

When the vehicle 12 has been switched on, at step S20 of FIG. 6 the head unit 20 reads the speech style and display style for each of the agents.

At step S21, the user U makes an utterance toward the head unit 20. For example, user U makes a request to an agent with an utterance such as "Agent, call Bob" or "Assistant, play some music".

At step S22, the head unit 20 performs speech recognition on the utterance speech of the user U.

At step S23, the head unit 20 detects which out of the proprietary agent or the non-proprietary agent to start up based on speech information from the speech recognition. For example, in cases in which the wake-up word "Agent" is present in the utterance speech, the head unit 20 detects the proprietary agent as the agent to start up. On the other hand, in cases in which the wake-up word "Assistant" is present in the utterance speech, the head unit 20 detects the non-proprietary agent as the agent to start up.

In cases in which the proprietary agent has been detected at step S23, processing transitions to the processing of step S24 to step S28.

At step S24, the head unit 20 transmits the speech information to the server of the agent detected at step S23. For example, in cases in which the user U has uttered "Agent, call Bob", speech information with the content "Call Bob" is transmitted to the proprietary server 14.

At step S25, the proprietary server 14 performs speech recognition based on the received speech information, and executes intent extraction thereon. For example, the proprietary server 14 extracts the intent of making a phone call to Bob from the speech information "Call Bob".

At step S26, the proprietary server 14 transmits the extracted intent to the head unit 20 as intent information.

At step S27, the head unit 20 sets the styles for the proprietary agent. Namely, the head unit 20 consults the setting data 120 in order to set the speech style and display style for the proprietary agent.

At step S28, the head unit 20 starts execution of the proprietary agent. Namely, on receipt from the proprietary server 14 of the intent information, which is to make a phone call to Bob, the head unit 20 starts up a phone call function, consults contact details for Bob either acquired from the proprietary server 14 or stored in the storage 20D, and makes a phone call to Bob. A phone call is thereby started by the head unit 20.

During execution of the proprietary agent, due to having consulted the setting data 120 in FIG. 3 the speech of any interactions providing guidance or the like is output from the speaker 26 with the voice characteristics of "Male C", and the proprietary logo is displayed in a flashing style on the touch panel 24.

In cases in which the non-proprietary agent has been detected at step S23 in FIG. 6, processing transitions to the processing of step S29 to step S33.

At step S29, the head unit 20 transmits the speech information to the server of the agent detected at step S23. For example, in cases in which the user U has uttered "Assistant, play some music", speech information with the content "play some music" is transmitted to the non-proprietary server 16.

At step S30, the non-proprietary server 16 performs speech recognition based on the received speech information, and executes intent extraction thereon. For example, the non-proprietary server 16 extracts an intent to play music from the speech information of "Play some music".

At step S31, the non-proprietary server 16 transmits the extracted intent to the head unit 20 as intent information.

At step S32, the head unit 20 sets the styles for the non-proprietary agent. Namely, the head unit 20 consults the setting data 120 in order to set the speech style and display style for the non-proprietary agent.

At step S33, the head unit 20 starts execution of the non-proprietary agent. Namely, on receipt of the intent information, which is to play music, from the non-proprietary server 16 the head unit 20 starts up an audio player and plays music as received from the non-proprietary server 16.

Note that during execution of the non-proprietary agent, due to having consulted the setting data 120 in FIG. 3 the speech of any interactions providing guidance or the like is output from the speaker 26 with the voice characteristics of "Female A", and the non-proprietary logo is displayed in a slide-in style on the touch panel 24.

Summary of First Exemplary Embodiment

The head unit 20 of the present exemplary embodiment is capable of executing plural agents. The output section 240 of the head unit 20 outputs information from the executing agent to the touch panel 24 and the speaker 26, thereby enabling an interaction to be performed with the user U. In the present exemplary embodiment, the change section 250 changes the reporting style of the touch panel 24 and the speaker 26 for each of the agents, thereby enabling the user U to identify the responding agent. The present exemplary embodiment is thereby capable of suppressing unsuccessful interactions with the agent.

In the present exemplary embodiment, the agent information is provided to the user U in the form of speech. The speech style in which this speech is provided is changed for each agent by the change section 250. The present exemplary embodiment thereby enables the agent to be distinguished based on this speech, enabling interaction to be provided to the user U without compromising driving safety when the user U is driving.

Moreover, in the present exemplary embodiment, the user U is able to select their preferred speech style, thereby enabling any uncanniness felt due to an unfamiliar speech style during interaction to be suppressed.

Furthermore, the head unit 20 of the present exemplary embodiment also provides agent information to the user U in the form of an image. The change section 250 changes the provided image to an identifying image such as a logo for each of the agents. The present exemplary embodiment thereby enables the agent to be distinguished, even if speech interaction has stopped.

Second Exemplary Embodiment

In the first exemplary embodiment, the proprietary agent and the non-proprietary agent are executed separately to each other. In contrast thereto, in a second exemplary embodiment, the non-proprietary agent is executed during execution of the proprietary agent. Explanation follows regarding points of difference from the first exemplary embodiment. Note that other configuration is similar to that of the first exemplary embodiment, and so detailed explanation thereof is omitted.

Figure 7:
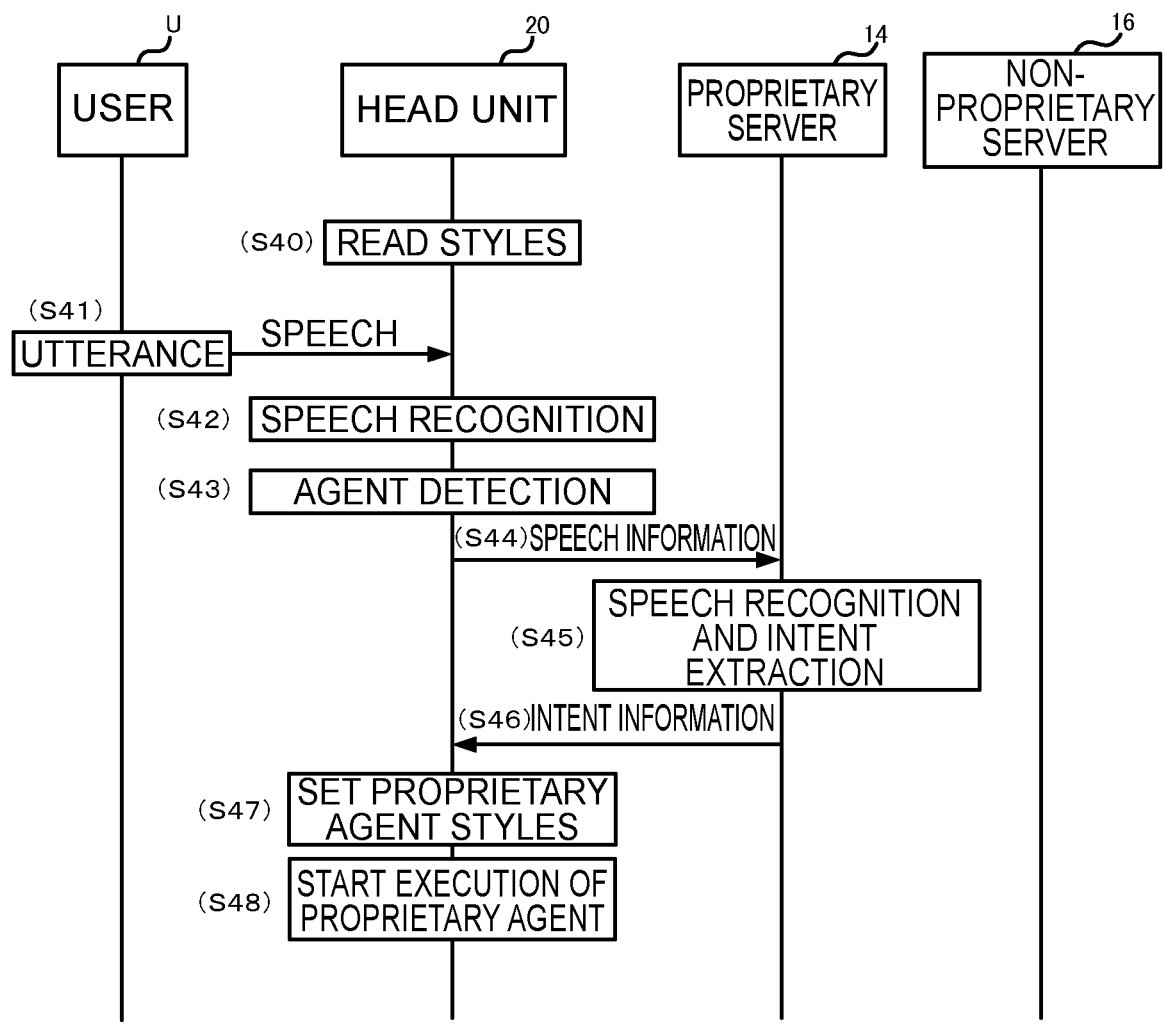
FIG. 7 is a sequence chart illustrating a flow of start-up processing in an agent system of a second exemplary embodiment.
Figure 8:
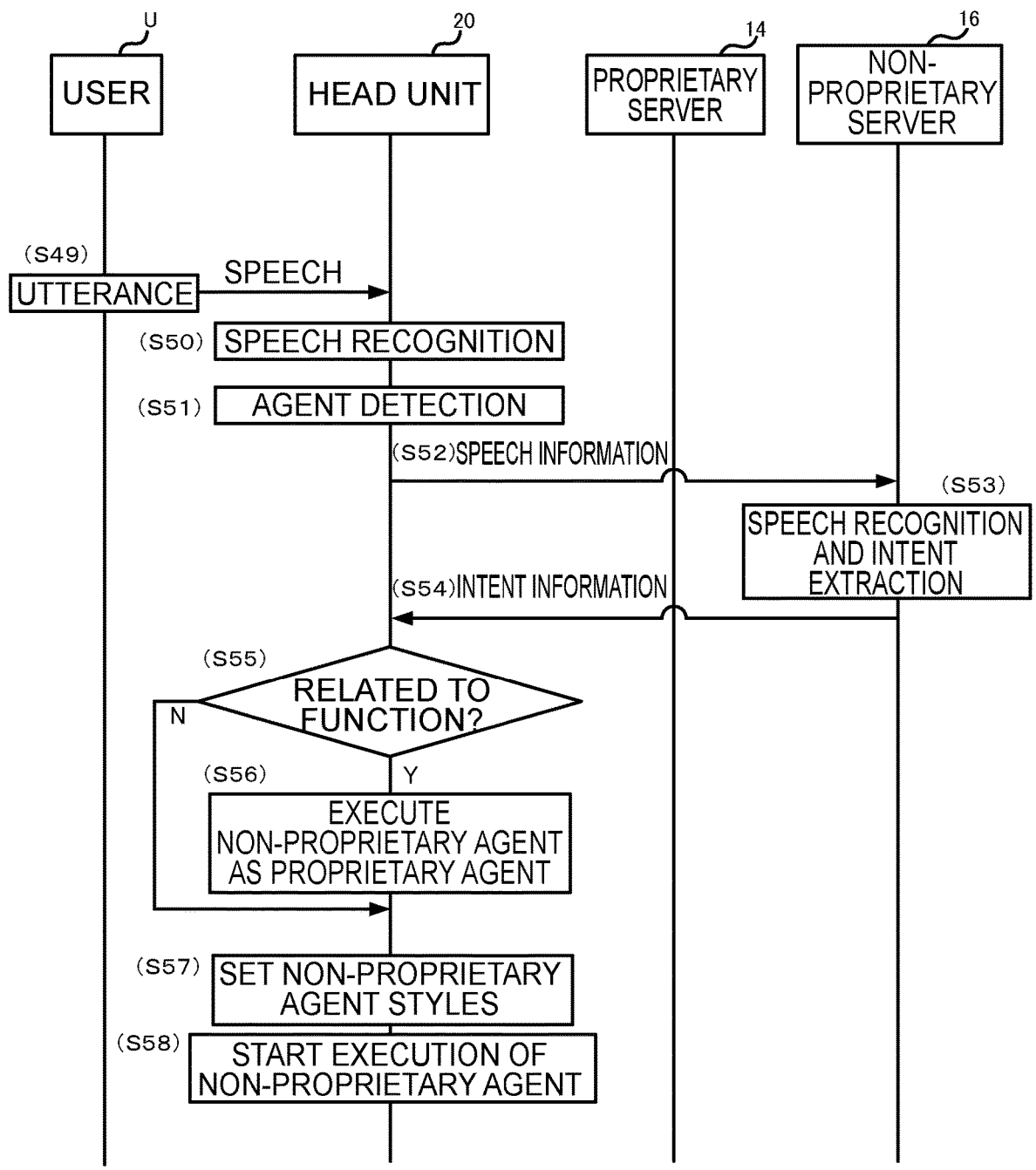
FIG. 8 is a sequence chart illustrating a flow of start-up processing in an agent system of the second exemplary embodiment, in a continuation from FIG. 7.

FIG. 7 and FIG. 8 illustrate start-up processing executed by the agent system 10 of the present exemplary embodiment.

When the vehicle 12 has been switched on, at step S40 of FIG. 7 the head unit 20 reads the speech style and display style for each of the agents.

At step S41, the user U makes an utterance toward the head unit 20. For example, the user U makes a request to an agent with an utterance such as "Agent, I want to go to Y".

At step S42, the head unit 20 performs speech recognition on the utterance speech of the user U.

At step S43, the head unit 20 detects which out of the proprietary agent or the non-proprietary agent to start up based on speech information from the speech recognition. Since the wake-up word "Agent" is present in the utterance speech in the example utterance of step S41, the head unit 20 detects the proprietary agent as the agent to start up.

At step S44, the head unit 20 transmits the speech information to the server of the agent detected at step S43. For the utterance "Agent, I want to go to Y", speech information with the content "I want to go to Y" is transmitted to the proprietary server 14.

At step S45, the proprietary server 14 performs speech recognition based on the received speech information, and executes intent extraction thereon. For example, the proprietary server 14 extracts an intent of providing route guidance to Y from the speech information of "I want to go to Y".

At step S46, the proprietary server 14 transmits the extracted intent to the head unit 20 as intent information.

At step S47, the head unit 20 sets the styles for the proprietary agent. Namely, the head unit 20 consults the setting data 120 in order to set the speech style and display style for the proprietary agent.

At step S48, the head unit 20 starts execution of the proprietary agent. Namely, on receipt of the intent information, which is to provide route guidance to Y, from the proprietary server 14 the head unit 20 starts up a car navigation function, and sets position information for Y as acquired from the proprietary server 14 as the destination of the vehicle 12. The head unit 20 thereby begins navigation to the destination Y.

Note that during execution of the proprietary agent, due to having consulted the setting data 120 in FIG. 3 the speech of any interactions providing guidance or the like is output from the speaker 26 with the voice characteristics of "Male C", and the proprietary logo is displayed in a flashing style on the touch panel 24.

Note that in cases in which the user U starts up the non-proprietary agent while the proprietary agent is in the process of executing the car navigation function, the following processing is executed.

At step S49 in FIG. 8, the user U makes an utterance toward the head unit 20. For example, the user U makes a request to an agent by uttering "Assistant, find a restaurant near Y".

At step S50, the head unit 20 performs speech recognition on the utterance speech of the user U.

At step S51, the head unit 20 detects which out of the proprietary agent or the non-proprietary agent to start up based on speech information from the speech recognition. Since the wake-up word "Assistant" is present in the utterance speech in the example utterance of step S49, the head unit 20 detects the non-proprietary agent as the agent to start up.

At step S52, the head unit 20 transmits the speech information to the server of the agent detected at step S51. For the utterance "Assistant, find a restaurant near Y", speech information with the content "Find a restaurant near Y" is transmitted to the non-proprietary server 16.

At step S53, the non-proprietary server 16 performs speech recognition based on the received speech information, and executes intent extraction thereon. For example, the non-proprietary server 16 extracts an intent of information provision regarding a restaurant near Y from the speech information of "Find a restaurant near Y".

At step S54, the non-proprietary server 16 transmits the extracted intent to the head unit 20 as intent information.

At step S55, the head unit 20 determines whether or not the received intent is related to a function of the proprietary agent that is currently being executed. In cases in which the head unit 20 determines that the received intent is related to a function of the proprietary agent that is currently being executed, processing proceeds to step S56. In cases in which the head unit 20 determines that the received intent is not related to a function of the proprietary agent that is currently being executed, processing proceeds to step S57.

At step S56, the head unit 20 executes the non-proprietary agent as the proprietary agent. In the present exemplary embodiment, when the head unit 20 receives the intent information relating to navigation to the destination Y, namely the intent information relating to the provision of information regarding a restaurant near Y, from the non-proprietary server 16, the head unit 20 displays restaurant information received from the non-proprietary server 16 on the touch panel 24. When this is performed, the speech of an interaction to provide guidance or the like is output from the speaker 26 with the voice characteristics of "Male C", and the proprietary logo is displayed in a flashing style on the touch panel 24. The user U is thereby able to discern that the restaurant information has been acquired during their interaction with the proprietary agent.

On the other hand, in cases in which the head unit 20 determines that the received intent is not related to a function of the proprietary agent that is currently being executed at step S55, then at step S57 the head unit 20 sets the styles for the non-proprietary agent. For example, in cases in which the received intent information is to play music, this being unrelated to navigation, the head unit 20 consults the setting data 120 in order to set the speech style and display style for the non-proprietary agent.

At step S58, the head unit 20 starts execution of the non-proprietary agent. On receipt of the intent information to play music from the non-proprietary server 16, the head unit 20 starts up the audio player and plays music as received from the non-proprietary server 16.

In the present exemplary embodiment, the speech style and display style are not changed in cases in which the non-proprietary agent is executed via execution of the proprietary agent. More specifically, in the present exemplary embodiment, when executing a function of the non-proprietary agent that is related to a function of the proprietary agent that is currently being executed, any interaction is performed using the speech style of the proprietary agent, and display on the touch panel 24 adopts the display style of the proprietary agent.

As long as the user U is able to receive a required service, it does not necessarily matter which agent provides this service. In cases in which information regarding a restaurant near to the destination is referenced during a flow of navigation to the destination as in the example of the present exemplary embodiment, the user U may find it uncanny if the speech style and display style change with every interaction. Thus, fixing the speech style and display style in cases in which the non-proprietary agent is executed via the proprietary agent as in the present exemplary embodiment enables any uncanniness felt as a result of the agent switching between interactions to be suppressed.

Note that the same speech style may be fixed for both agents, such that only the display style changes. So doing enables the user U to be informed which agent is actually active, while suppressing any uncanniness felt as a result of the agent switching between interactions.

Although an example has been given in which the non-proprietary agent is executed via the proprietary agent in the present exemplary embodiment, there is no limitation thereto. A configuration may be applied in which the speech style and display style are also fixed in cases in which the proprietary agent is executed via the non-proprietary agent.

REMARKS

Although the variety of speech output from the speaker 26 is changed as the speech style in the above exemplary embodiments, there is no limitation thereto. Alternatively, a direction from which sound is output may be changed for each of the agents. For example, the proprietary agent may output speech from a speaker 26 on a right side, and the non-proprietary agent may output speech from a speaker 26 on a left side.

Note that in the exemplary embodiments described above, the various processing executed by the CPU 20A reading and executing software (a program) may be executed by various types of processor other than the CPU. Such processors include programmable logic devices (PLD) that allow circuit configuration modification post-manufacture, such as a field-programmable gate array (FPGA), and dedicated electric circuits, these being processors including a custom-designed circuit configuration for executing specific processing, such as an application specific integrated circuit (ASIC). The various processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the exemplary embodiments described above, explanation has been given of cases in which respective programs are pre-stored (installed) on a computer-readable non-transitory storage medium. For example, the processing program 100 of the head unit 20 is pre-stored in the storage 20D. However, there is no limitation thereto, and the respective programs may be provided in a format recorded on a non-transitory storage medium such as a compact disc read only memory (CD-ROM), digital versatile disc read only memory (DVD-ROM), or universal serial bus (USB) memory. Alternatively, the programs may be provided in a format downloadable from an external device over a network.

The processing flows in the exemplary embodiments described above are merely examples thereof, and unnecessary steps may be removed, new steps may be added, or the processing sequence may be changed within a range not departing from the spirit thereof

What is claimed is:

1. An agent control device capable of executing a plurality of agents, the agent control device comprising a processor and the processor being configured to:
   output information from an agent that is being executed to a reporting section; and change a reporting style of the reporting section for each of the agents;

wherein, in a case in which a second agent is executed while a first agent is being executed and a function executed by the second agent relates to a function of the first agent being executed, the processor is configured to execute the function of the second agent through the first agent while maintaining a reporting style of the first agent without changing to a reporting style of the second agent.

2. The agent control device of claim 1, wherein:
the reporting section includes a speaker; and
the processor is configured to change a speech style for each of the agents.

3. The agent control device of claim 2, wherein a user is able to select one speech style from among a plurality of the speech styles.

4. The agent control device of claim 1, wherein:
the reporting section includes a display device; and
the processor is configured to change an identifying image for identifying each respective agent.

5. The agent control device of claim 1, wherein in a case in which the second agent is executed while the first agent is being executed and the function executed by the second agent is not related to the function of the first agent being executed, the processor is configured to change to the reporting style of the second agent and to cause the second agent to execute the function of the second agent.

6. The agent control device of claim 1, wherein in a case in which the reporting style of the first agent or the second agent is to be changed, a same fixed speech style is used for the first agent and the second agent, while a display style is changed.

7. An agent control method for an agent control device capable of executing a plurality of agents, the agent control method including executing processing by a computer, the processing comprising:

processing to output information from an agent that is being executed to a reporting section; and processing to change a reporting style of the reporting section for each of the agents;

wherein, in a case in which a second agent is executed while a first agent is being executed and a function executed by the second agent relates to a function of the first agent being executed, the processing further comprises processing to execute the function of the second agent through the first agent while maintaining a reporting style of the first agent without changing to a reporting style of the second agent.

8. The agent control method of claim 7, wherein in a case in which the second agent is executed while the first agent is being executed and the function executed by the second agent is not related to the function of the first agent being executed, the processing further comprises processing to change to the reporting style of the second agent and to cause the second agent to execute the function of the second agent.

9. The agent control method of claim 7, wherein in a case in which the reporting style of the first agent or the second agent is to be changed, a same fixed speech style is used for the first agent and the second agent, while a display style is changed.

10. A non-transitory storage medium storing a program to control an agent control device capable of executing a plurality of agents, the program being executable by a computer to perform processing, the processing comprising:

processing to output information from an agent that is being executed to a reporting section; and processing to change a reporting style of the reporting section for each of the agents;

wherein, in a case in which a second agent is executed while a first agent is being executed and a function executed by the second agent relates to a function of the first agent being executed, the processing further comprises processing to execute the function of the second agent through the first agent while maintaining a reporting style of the first agent without changing to a reporting style of the second agent.

11. The non-transitory storage medium of claim 10, wherein in a case in which the second agent is executed while the first agent is being executed and the function executed by the second agent is not related to the function of the first agent being executed, the processing further comprises processing to change to the reporting style of the second agent and to cause the second agent to execute the function of the second agent.

12. The non-transitory storage medium of claim 10, wherein in a case in which the reporting style of the first agent or the second agent is to be changed, a same fixed speech style is used for the first agent and the second agent, while a display style is changed.

* * * * *